United States Patent
Chung et al.

(10) Patent No.: US 8,155,150 B1
(45) Date of Patent: Apr. 10, 2012

(54) COOPERATIVE MAC LEARNING/AGING IN HIGHLY DISTRIBUTED FORWARDING SYSTEM

(75) Inventors: Sammy Chung, Saratoga, CA (US); Dongyi Jiang, Milpitas, CA (US); Tsai-Zong Lin, Cupertino, CA (US); Jin Shang, Newark, CA (US); Anthony Ng, Petaluma, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 268 days.

(21) Appl. No.: 12/401,911

(22) Filed: Mar. 11, 2009

(51) Int. Cl.
    *H04J 3/24* (2006.01)
(52) U.S. Cl. .................................. 370/475; 370/258
(58) Field of Classification Search .................. 370/241, 370/258, 406, 471, 475
    See application file for complete search history.

(56) References Cited

U.S. PATENT DOCUMENTS

| 6,735,198 B1* | 5/2004 | Edsall et al. .................. 370/389 |
| 2005/0021846 A1* | 1/2005 | Tzeng et al. .................. 709/238 |
| 2010/0085982 A1* | 4/2010 | Martinotti et al. ............ 370/420 |

* cited by examiner

*Primary Examiner* — Ricky Ngo
*Assistant Examiner* — Wei-Po Kao
(74) *Attorney, Agent, or Firm* — Harrity & Harrity, LLP

(57) ABSTRACT

A method may be performed by a device in a network, the device including multiple security process units (SPUs). The method includes receiving a packet over the network, the packet including a media access control (MAC) address, and assigning one SPU as the MAC address owner. The method also includes sending information about the MAC address to other SPUs within the device, storing the MAC address in a MAC table within each SPU, and initiating a MAC age query to confirm the MAC address has timed out among all SPUs. The MAC age query is passed via a logical ring of the SPUs beginning with the MAC address owner. If the MAC address is aged out at each SPU, the MAC address is deleted from each MAC table. If the MAC entry is still active, a different SPU is assigned as the MAC address owner.

19 Claims, 7 Drawing Sheets

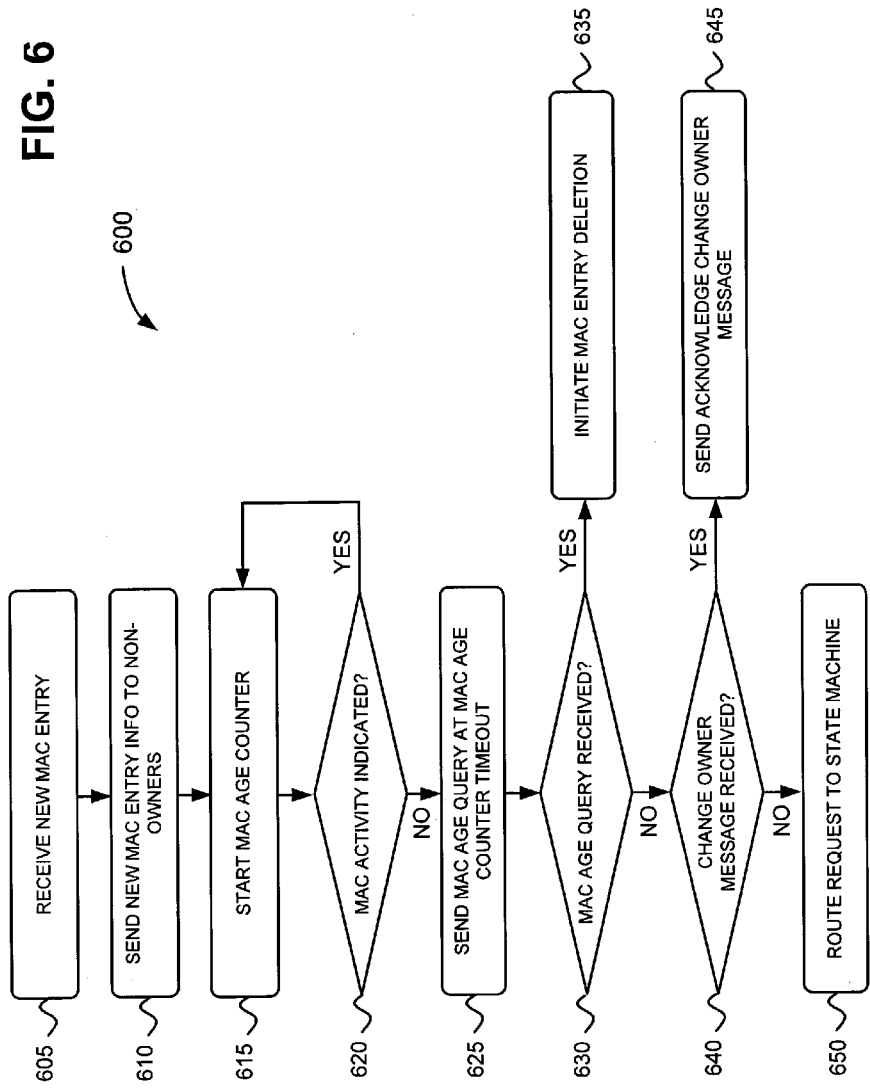

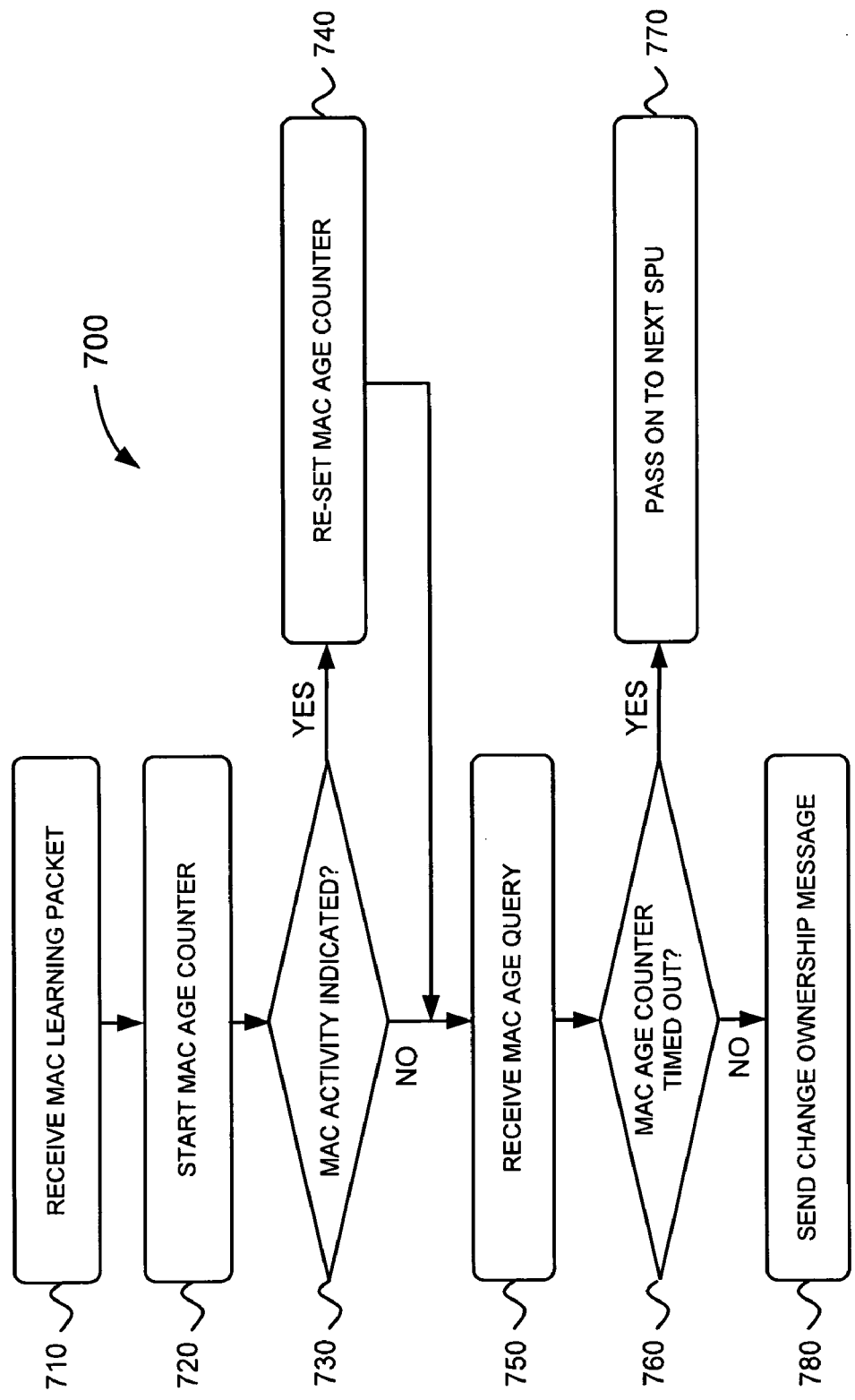

COOPERATIVE MAC LEARNING/AGING IN HIGHLY DISTRIBUTED FORWARDING SYSTEM

BACKGROUND

In networks, data is typically exchanged between communicating devices in the Form of "frames." Frames include a source MAC (media access control) address and a destination MAC address; a MAC address uniquely identifies a network device in a layer 2 communication protocol used, for example, in Ethernet LANs.

A layer 2 (L2) switch is a switching device which receives packets containing data or control information on one port, and based on the MAC address contained within the packet, switches the packet out another port. The L2 switch generally includes a table that maps MAC addresses with output ports. To facilitate forwarding, the L2 switch may perform MAC address "learning." MAC address learning refers to a process for reducing network traffic, wherein the source MAC address in a received frame is recorded in an address database along with its port of origin. This allows future frames destined for the source address to be forwarded only to the port on which that address is located.

Learned MAC addresses may be stored in a MAC address table of finite capacity. Typically, once a maximum number of MAC addresses is reached, new entries are not accepted or the earliest stored addresses are overwritten with new information. To avoid rejection of new entries or overwriting, an aging period may be defined for each MAC table entry so that unused MAC addresses are discarded to create space for new information. This aging period may be considered the maximum time during which an entry in the MAC address table is valid.

In a typical L2 switch with a single central processing unit (CPU) or center point, the CPU can age out a MAC address if there is no activity for the duration of the aging period.

However, for multi-CPU switches, the MAC learning/aging function and MAC forwarding function may be distributed among multiple CPUs. Thus, if a MAC entry ages out at one learning CPU, the other CPUs must first be consulted before the entry may be deleted. Thus, the MAC address learning/aging functions in a distributed multi-CPU L2 switch may require an undesirable amount of internal message traffic.

SUMMARY

According to one implementation, a device may include a plurality of security process units (SPUs). Each SPU may include a media access control (MAC) table to store a plurality of MAC entries and a processor. The processor may designate the SPU as a MAC owner when the SPU receives a new MAC entry; send the new MAC entry to each of the other SPUs; initiate, when the MAC entry ages out at the SPU, a MAC age query through a logical ring of the other SPUs; receive back the MAC age query if the MAC entry has aged out at each of the other SPUs; and initiate deletion of the MAC entry from the MAC table based on the receiving back the MAC age query.

According to another implementation, a method of managing MAC entry aging in a device having distributed architecture of multiple SPUs is provided. The method may include receiving a MAC entry at a first SPU, the first SPU being designated as a MAC owner; sending the MAC entry from the first SPU to each of the other SPUs; initiating, when the MAC entry ages out at the first SPU, a MAC age query from the first SPU serially through a logical ring of the other SPUs; receiving the MAC age query at the first SPU if the MAC entry has aged out at each of the other SPUs; and initiating, by the first SPU, deletion of the MAC entry based on the receiving the MAC age query at the first SPU.

In still another implementation, a device may include means for receiving a MAC entry at a first SPU, the first SPU being designated as a MAC owner; means for sending the MAC entry from the first SPU to one or more other SPUs within the device; means for monitoring an inactivity age of the MAC entry at the first SPU and the one or more other SPUs; means for initiating, when the inactivity age reaches a particular threshold at the first SPU, a MAC age query from the first SPU through a logical ring of the one or more other SPUs; means for receiving the MAC age query at the first SPU if the inactivity age reaches the particular threshold out at each of the one or more other SPUs; and means for initiating deletion of the MAC entry based on the means for receiving the MAC age query at the first SPU.

According to a further implementation, a method may be performed by a device in a network, the device including a plurality of SPUs. The method may include receiving a packet over the network, the packet including a media access control (MAC) address; assigning an SPU as an owner of the MAC address; sending information about the MAC address to other SPUs within the device; storing the MAC address in a MAC table within each SPU; initiating a MAC age query by the owner of the MAC address to confirm the MAC address has timed out among all SPUs, where the MAC age query is passed via a logical ring of the SPUs beginning and ending with the owner of the MAC address; initiating deletion of the MAC address from each of the MAC tables if the MAC address has timed out among all SPUs; and assigning a different SPU as the owner of the MAC address if the MAC address has not timed out among all SPUs.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 6 illustrates a flow chart of an exemplary process implemented by a MAC owner according to implementations described herein; and FIG. 7 illustrates a flow chart of an exemplary process implemented by a non-owner according to implementations described herein.

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

Systems and methods described herein provide ring-based cooperative MAC learning/aging to reduce internal message traffic within a network device, such as a layer 2 switch or other network device. To achieve load balancing in a highly distributed device, the MAC processing functions may accomplished by a variety of security process units (SPUs) that each store a copy of a global MAC table. One SPU may register a MAC entry as having timed out while other SPUs may still be processing packets using that MAC entry. A MAC age query may be initiated by one SPU (e.g., a MAC owner) and passed along a logical ring of SPUs to confirm a particular MAC entry has timed out among all SPUs. If an SPU within the ring has not timed out the particular MAC entry, the SPU may initiate a change of ownership for that MAC entry.

Exemplary Network Device Configuration

Figure 1:
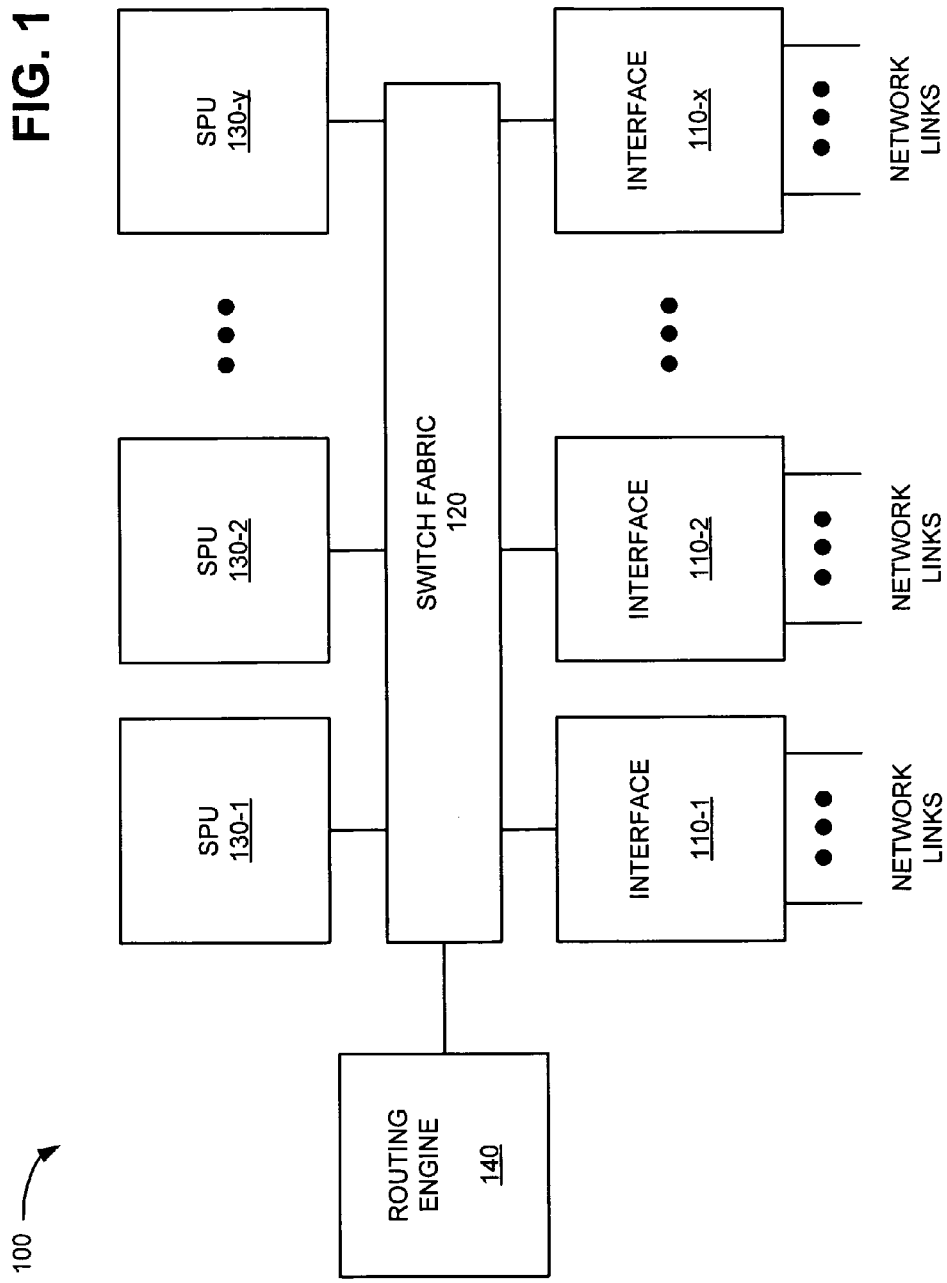
FIG. 1 is a diagram of an exemplary device in which systems and/or methods, described herein, may be implemented.

FIG. 1 is a diagram of an exemplary device 100 in which systems and/or methods, described herein, may be implemented. Device 100 may include any type of network device, such as a switch, a bridge, a router, or a gateway, that directs or switches incoming packets from multiple input locations to multiple output locations.

As shown, device 100 may include a group of interfaces 110-1 through 110-x (referred to herein collectively as "interfaces 110" and generically as "interface 110"), a switch fabric 120, a group of security process units (SPUs) 130-1 through 130-y (referred to herein collectively as "SPUs 130" and generically as "SPU 130"), and a routing engine (RE) 140. In other implementations, device 100 may include fewer, additional, different, or differently arranged components than those illustrated in FIG. 1. For example, in one implementation, device 100 may include state machines and/or other processors associated with each SPU 130.

Interfaces 110 may include devices or assemblies, such as stackable switches, or line cards, for receiving incoming packets from network links (or from other interfaces 110) and for transmitting the packets to network links (or to other interfaces 110). For example, interfaces 110 may include Ethernet interfaces, optical carrier (OC) interfaces, and/or asynchronous transfer mode (ATM) interfaces. Interfaces 110 may manage a set of input ports via which packets can be received and a set of output ports via which packets can be transmitted. As used herein, the term "packet" may refer to a packet, a datagram, or a cell; a fragment of a packet, a datagram or a cell; or another type or arrangement of data.

Switch fabric 120 may include one or more switching planes to facilitate communication among interfaces 110 and/or SPUs 130. In one implementation, each of the switching planes may include a single or multi-stage switch of crossbar elements. Switch fabric 120 may additionally, or alternatively, include processors, memories, and/or paths that permit communication among SPUs 130 and interfaces 110. Switch fabric 120 may be used to distribute a flow of packets from interfaces 110 to SPUs 130 to achieve load balancing among the SPUs.

SPUs 130 may include one or more processors, microprocessors, application specific integrated circuits (ASICs), field programming gate arrays (FPGAs), and/or processing logic that may be optimized for networking and communications. SPU 130 may perform high level management functions for device 100. For example, SPU 130 may examine each packet received from a respective interface 110 and determine whether security screening is to be performed. In one implementation, SPU 130 may examine the L2 header for each packet. The L2 header may include a destination MAC address that can be mapped to an egress port on the device using a MAC table. In some implementations, SPU 130 may be included within a packet forwarding engine PFE that includes other processing components.

RE 140 may perform high level management functions for device 100. For example, RE 140 may communicate with other network devices, networks, and/or systems connected to device 100 to exchange information regarding network topology. RE 140 may create routing tables based on the network topology information, create forwarding tables (e.g., MAC table 230) based on the routing tables, and forward the forwarding tables to SPUs 130. SPUs 130 may use the forwarding tables to perform route lookups for incoming packets. RE 140 may also perform other general control and monitoring functions for device 100.

Figure 2:
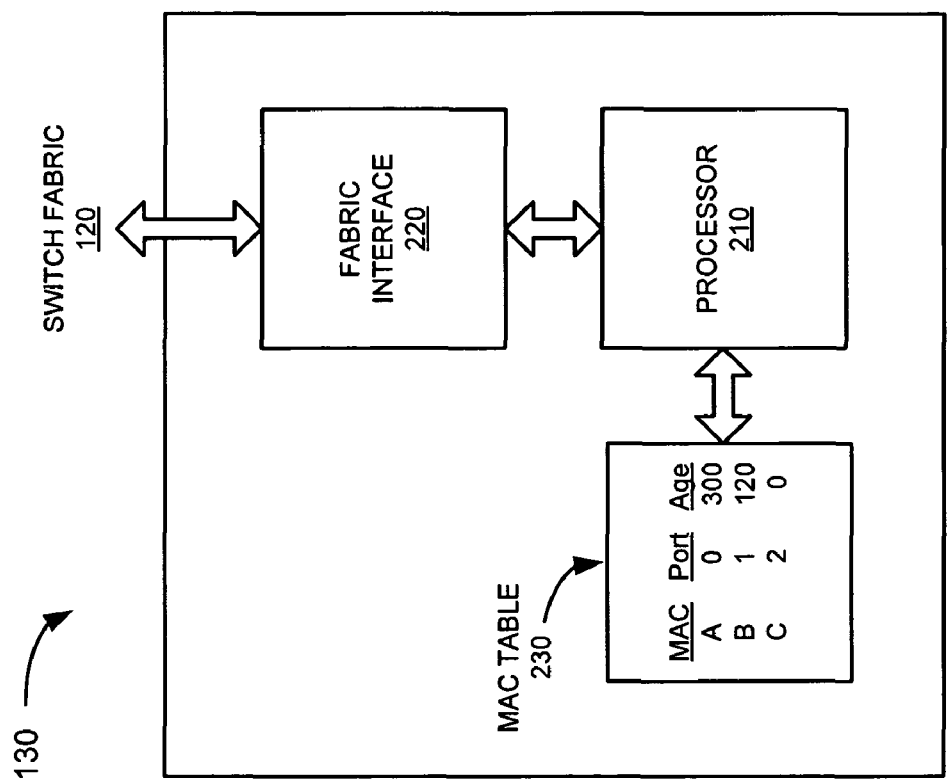
FIG. 2 is a block diagram illustrating exemplary components of a security process unit (SPU) of FIG. 1.

FIG. 2 is a diagram illustrating exemplary components of SPU 130. As shown in FIG. 2, SPU 130 may include a processor 210, a fabric interface 220, and a MAC table 230. In other implementations, SPU 130 may include fewer, additional, different, or differently arranged components than those illustrated in FIG. 2.

Processor 210 may include hardware, or a combination of hardware and software, that may receive, store, process, and/or forward packets. For example, processor 210 may process packets received from incoming interface 110 and prepare packets for transmission on outgoing interfaces 110. In an implementation, processor 210 may conduct sanity checking and apply certain screens to incoming packets. Processor 210 may also make forwarding decisions based on header information of the packets. In one implementation, processor 210 may include a memory to aid in the storing, processing, and/or forwarding of received packets.

Fabric interface 220 may include hardware, or a combination of hardware and software, that provide an interface to switch fabric 120. For example, fabric interface 220 may include one or more buffers (not shown) for temporarily storing augmented packets (e.g., packets pre-pended with additional header information) received from processor 210. The buffers may prevent the packets from being dropped if a bottleneck (e.g., a processing delay) develops on a line interface-to-line interface path during packet transport.

MAC table 230 may include a compilation of MAC source and/or destination addresses of frames received by device 100. The term "table," as used herein, may refer to any searchable form or arrangement of data within a memory. Processor 210 may perform a lookup of MAC table 230, may obtain a packet descriptor that includes a forwarding address (e.g., a destination switch fabric port, a destination network port, etc.), and information for processing the packet, may sample the packet, and may manage the sampled packet and/or packet statistics.

When an SPU 130 receives a frame for a MAC address not already listed in MAC table 230, SPU 130 may flood the MAC learning packets to all other SPUs 130 within device 100. MAC table 230 may be a classification table, a forwarding table, and/or any other table that may be used for processing packets. MAC table 230 may be configured to include a fixed memory size and, thus, may be limited in the number of MAC entries that can be stored in MAC table 230. Each MAC entry may include a MAC age timer that re-sets when the SPU identifies activity for the particular MAC entry. If a MAC age timer experiences no activity for a certain period of time (e.g., 300 seconds), then the associated MAC entry may be deemed "aged out" or inactive. Inactive MAC entries may eventually deleted to create room for new MAC entries in MAC table 230. According to implementations described herein, consensus of inactive MAC entries may achieved among all SPUs 130 before a particular MAC entry may be deleted.

Exemplary Operations

Figure 3:
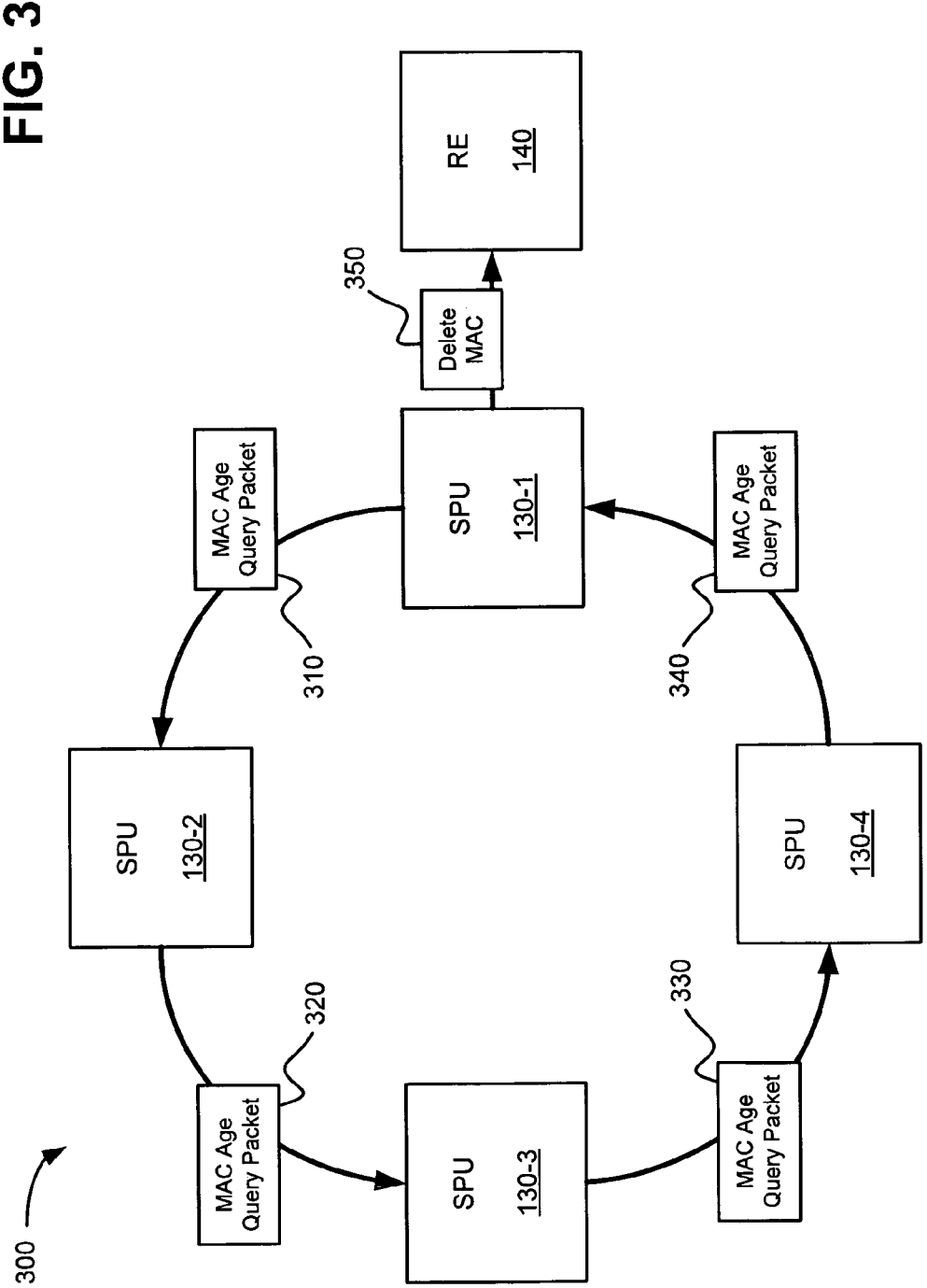
FIGS. 3 and 4 illustrate diagrams of exemplary MAC learning/aging operations capable of being performed by the device of FIG. 1.
Figure 4:
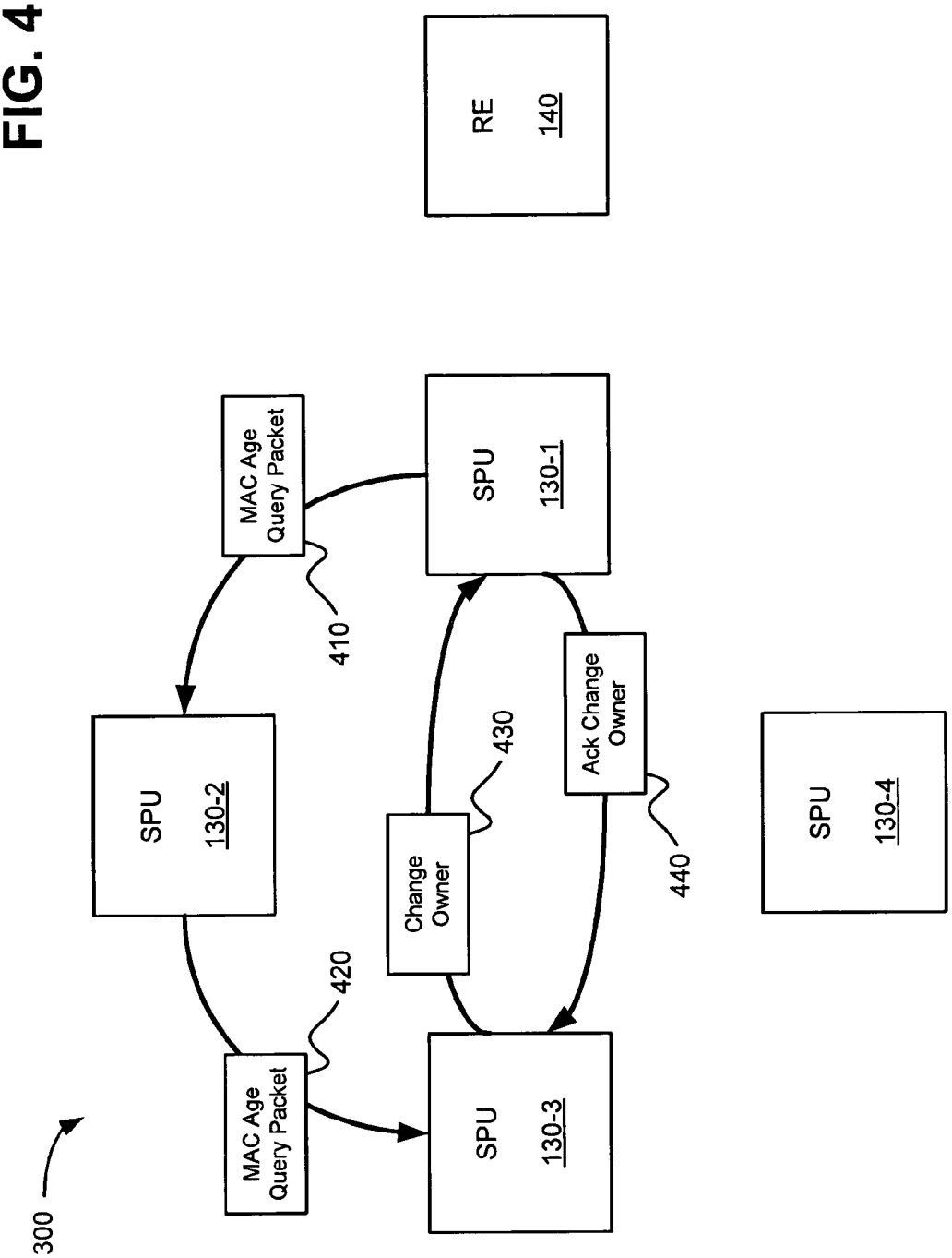

FIGS. 3 and 4 illustrate diagrams of exemplary MAC learning/aging operations capable of being performed by an exemplary portion 300 of device 100. FIG. 3 illustrates data flow for a successful MAC age out. FIG. 4 illustrates data flow for a MAC owner change based on MAC activity. As illustrated, exemplary portion 300 may include a routing engine 140 and a logical ring of SPUs including SPU 130-1, SPU 130-2, SPU 130-3, and SPU 130-4. SPUs 130 and RE 140 may include the features described above in connection with, for example, FIGS. 1 and 2.

Inter-processor communication (IPC) messages may be passed among SPUs 130 and/or RE 140 to facilitate MAC learning/aging operations. IPC messages may include MAC age query packets, such as MAC age query packets 310-340; delete MAC packets, such as delete MAC packet 350; MAC learning packets (not shown); change owner packets; and acknowledge change owner packets. Change owner packets and acknowledge change owner packets are discussed below with respect to FIG. 4.

The logical ring of SPUs 130-1 through 130-4 may include a single MAC-entry-owner SPU 130-1 (referred to herein as the "MAC owner"), while the remaining SPUs (i.e., SPU 130-2, 130-3 and 130-4) are non-owners. The MAC owner may be the SPU 130 that learns a new MAC entry in the MAC entry database. For example, SPU 130-1 may receive a new MAC entry based on receipt of a frame from an interface 110 and, thus, be established as the MAC owner for that MAC entry.

In implementations described herein, the MAC owner may be responsible for two tasks. First, the MAC owner may send MAC learning packets to the other SPUs to synchronize newly learned MAC entries, and also provide an add MAC packet to RE 140. The MAC learning packets may be sent as a batch to all the other SPUs simultaneously. Second, the MAC owner may send MAC age query packets to an adjacent SPU 130 within the logical ring when a MAC entry has (or is about to) age out. If a MAC age query packet transits the logical ring of SPUs and is returned to the MAC owner, then the MAC owner may provide a delete MAC packet to RE 140.

Non-owner SPUs may learn of the new MAC entry via MAC learning packets sent from the MAC owner. When one of the non-owner SPUs receives a MAC age query packet, the non-owner SPU may check its own MAC table to confirm whether it agrees with the query. If so, the non-owner SPU may pass on the MAC age query packet to the next adjacent SPU in the logical ring. Conversely, if the non-owner SPU sees activity for the particular MAC entry (e.g., the MAC entry has not timed out), then the non-owner SPU may send a change owner packet to the MAC owner to claim ownership of the particular MAC.

Assume for FIG. 3 that SPU 130-1 is the MAC owner for a particular MAC entry. When the MAC aging timer for the particular MAC entry ages out at SPU 130-1, SPU 130-1 may send MAC age query packet 310 to the logically adjacent SPU 130-2. If the MAC aging timer for the MAC entry has also aged out at SPU 130-2, SPU 130-2 may pass MAC age query packet 320 to SPU 130-3. If the MAC aging timer for the MAC entry has also aged out at SPU 130-3, SPU 130-3 may pass MAC age query packet 330 to SPU 130-4. If the MAC aging timer for the MAC entry has also aged out at SPU 130-4, SPU 130-4 may pass MAC age query packet 340 back to the MAC owner, SPU 130-1. Upon receiving MAC age query packet 340, SPU 130-1 may initiate deletion of the particular MAC entry by, for example, sending delete MAC packet 350 to interface 110 to remove the MAC entry from the global MAC table (i.e., "age out" the MAC entry).

Assume for FIG. 4 that SPU 130-1 starts as the MAC owner for a particular MAC entry. When the MAC aging timer for the particular MAC entry ages out at SPU 130-1, SPU 130-1 may send MAC age query packet 410 to the logically adjacent SPU 130-2. If the MAC aging timer for the MAC entry has also aged out at SPU 130-2, SPU 130-2 may pass MAC age query packet 420 to SPU 130-3. If the MAC aging timer for the MAC entry has not aged out at SPU 130-3 (e.g., activity at SPU 130-3 has caused the MAC aging timer at SPU 130-3 to re-set), SPU 130-3 will not pass a MAC age query packet to SPU 130-4. Instead, SPU 130-3 may send a change owner packet 430 to SPU 130-1 to claim ownership of the MAC entry. SPU 130-1 may respond with an acknowledge change owner packet 440 to confirm the ownership change. The MAC entry may remain active until the MAC entry ages out at SPU 130-3, at which point SPU 130-3 may initiate a MAC age query packet in a manner similar to that shown in FIG. 3.

Although FIGS. 3 and 4 show exemplary components of portion 300 of device 100, in other implementations, portion 300 may contain fewer, additional, different, or differently arranged components than depicted in FIGS. 3-4. For example, portion 300 may also include a state machine associated with each of SPUs 130 to resolve message handling errors. For example, the state machine may intervene in the event a MAC age query packet or a change owner packet is lost. As another example, state machines may also manage garbage collection functions to delete inactive MAC entries that were not initiated by the MAC owner (e.g., due to removal or shutdown of the MAC owner SPU). In still other implementations, one or more components of portion 300 may perform one or more other tasks described as being performed by one or more other components of portion 300.

Exemplary Processes

Figure 5:
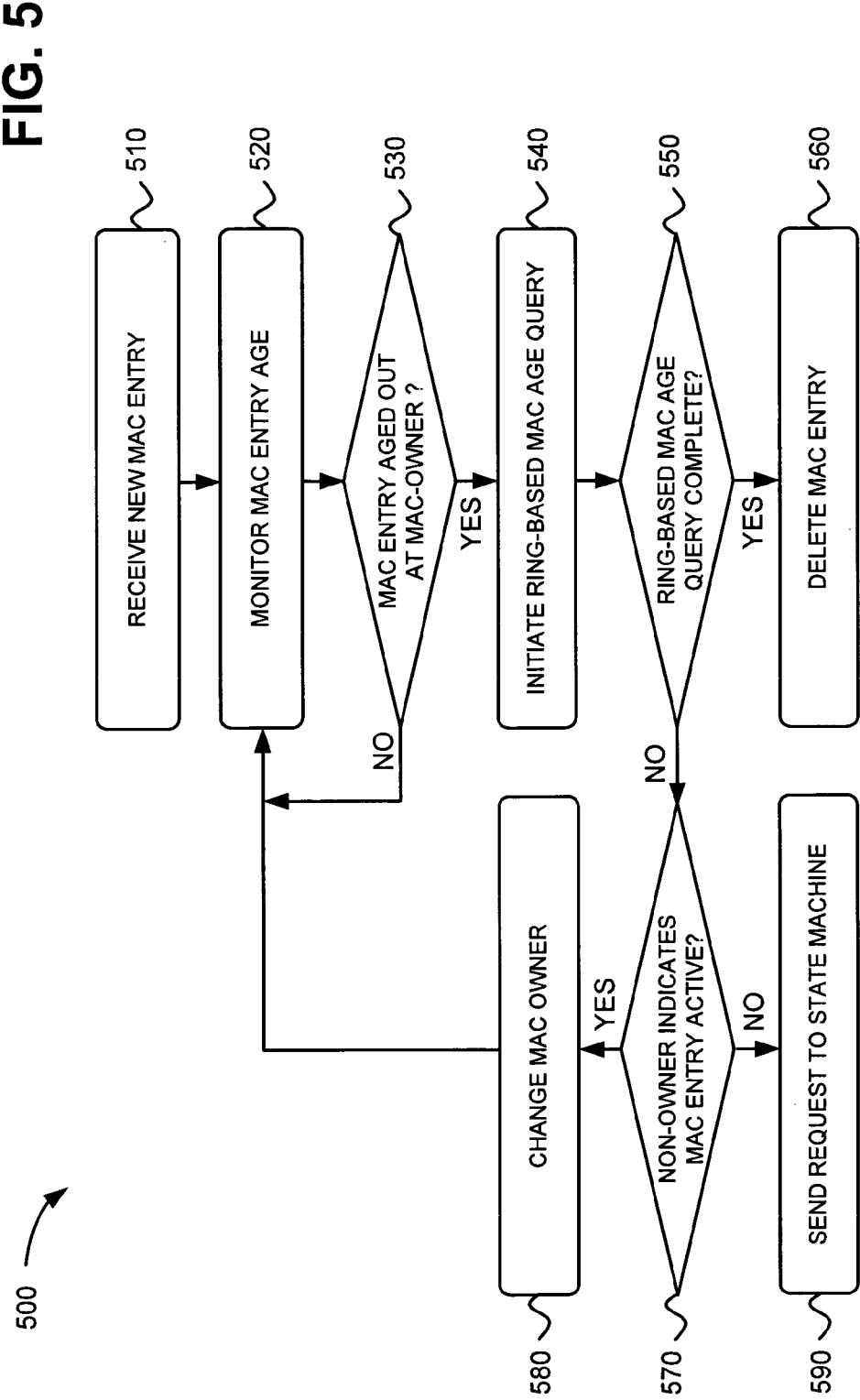
FIG. 5 illustrates a flow chart of an exemplary process for performing ring-based MAC learning/aging according to implementations described herein.

FIG. 5 illustrates a flow chart of an exemplary process 500 for performing ring-based MAC learning/aging according to implementations described herein. In one implementation, process 500 may be performed by components of device 100. In another implementation, some or all of process 500 may be performed by another device or group of devices, including or excluding device 100.

As illustrated in FIG. 5, process 500 may begin with receiving a new MAC entry (block 510). For example, an SPU 130 may receive a packet from an interface 110 that includes a new MAC entry (e.g., a MAC entry not already included in the MAC table for the SPU). The SPU may become the MAC owner for the particular MAC entry and may send an IPC message (e.g., MAC learning packets) to each of the other SPUs 130 to inform the other SPUs of the new MAC entry, and also provide an add MAC packet to RE 140. Each SPU may have a copy of a global MAC table, and all the MAC tables may be synchronized by IPC messages. Since the SPUs 130 are highly distributed, the MAC learning SPU (e.g., the MAC owner) for a particular MAC entry may be different than the forwarding SPU.

The MAC entry age may be monitored (block 520). For example, each SPU 130 may include a MAC age timer to monitor idle time for the particular MAC entry. The MAC age timer may include a counter value (e.g., 300 seconds) that is re-set each time activity for the MAC entry occurs. When the MAC age counter value expires, the MAC entry may be eligible for deletion from the MAC table.

It may be determined if the MAC entry aged out at the MAC owner (block 530). For example, it may be determined if the MAC age counter value ages out at the MAC owner SPU. If the MAC entry has not aged out at the MAC owner (block 530—NO), then MAC age will continue to be monitored, even if the MAC entry has aged out at one or more non-owner SPUs. If the MAC entry has aged out at the MAC owner (block 530—YES), then the MAC owner may initiate a ring-based MAC age query (block 540). For example, the MAC owner SPU may send a MAC age query packet to an adjacent SPU in the logical SPU ring.

It may be determined if the ring-based MAC age query is completed (block 550). For example, if the particular MAC entry has aged out at each of the non-owner SPUs, the MAC age query packet may transit the logical ring and return to the MAC owner. If the MAC age query packet has not aged out at a non-owner SPU, then the transit of the MAC age query packet may be interrupted and not be returned to the MAC owner. Also, the ring-based MAC age query may fail to be completed due to, for example, a failure of a non-owner SPU.

If the ring-based MAC age query is completed (block 550—YES), then the MAC entry may be deleted (block 560). For example, the MAC owner may delete the MAC entry from the global MAC table by initiating IPC messages to the other SPUs and to RE 140. If the ring-based MAC age query is not completed (block 550—NO), then it may be determined if a non-owner indicates the MAC entry is active (block 570). For example, in response to the MAC age query packet, each subsequent non-owner SPU in the logical ring may determine the MAC entry has aged out on the MAC table of the non-owner SPU. If a non-owner indicates the MAC entry is active (block 570—YES), then the MAC owner may be changed (block 580). For example, a non-owner SPU may send a change owner message directly to the MAC owner to indicate the particular MAC entry is still active (e.g., the MAC entry has not aged out on the MAC table of the non-owner SPU) and to request ownership. The previous MAC owner may send an acknowledge change owner message to the sender of the change owner message to confirm the ownership change.

If the ring-based query is not completed and no non-owner SPU indicates the MAC entry is active (block 570—NO), then a request may be sent to a state machine (block 590). For example, if the MAC owner fails to receive either a MAC age query packet or a change owner message within a particular time interval after initiating the ring-based MAC age query, then the MAC owner may send a query to a state machine (e.g., RE 140 or another designated component) for processing.

FIG. 6 illustrates a flow chart of an exemplary process 600 for a MAC owner according to implementations described herein. Process 600 may be performed by a MAC owner of a particular MAC entry in a device having a set of ring-based distributed SPUs. Assume for discussion of process 600 that SPU 130-1 is the MAC owner that forms a logical ring with non-owner SPUs 130-2, 130-3, and 130-4.

As illustrated in FIG. 6, process 600 may begin with receiving a new MAC entry (block 605). For example, the MAC owner (e.g., SPU 130-1) may receive a packet from an interface 110 that includes a new MAC entry (e.g., a MAC entry not already included in the MAC table for the SPU).

The new MAC entry information may be sent to non-owners (block 610). For example, SPU 130-1 may broadcast an IPC message (e.g., MAC learning packets) to each of the other SPUs 130 to inform the other SPUs of the new MAC entry.

A MAC age counter may be started (block 615). For example, SPU 130-1 may initiate a MAC age counter for the particular MAC entry. It may be determine if MAC activity is indicated (block 620). For example, it may be determined if the MAC owner receives indications of subsequent packets having the same MAC entry. If MAC activity is indicated (block 620—YES), then the process may return to block 620 to restart the MAC age counter. If no MAC activity is indicated (block 620—NO), then a MAC age query may be sent when the MAC age counter times out (block 625). For example, SPU 130-1 may send a MAC age query packet to the adjacent SPU in the logical SPU ring.

It may be determined if the MAC age query is received (block 630). For example, SPU 130-1 may determine whether the MAC age query packet is returned to the MAC owner within a particular time limit. If the MAC age query is received (block 630—YES), then the deletion of the MAC entry may be initiated (block 635). For example, SPU 130-1 may send a delete MAC packet to RE 140, and RE 140 can send delete messages to all SPUs to delete the MAC entry.

If the MAC age query is not received (block 630—NO), then it may be determined if a change owner message is received (block 640). For example, SPU 130-1 may receive a change owner message from a non-owner SPU. If the change owner message is received (block 640—YES), then an acknowledge change owner message may be sent (block 645). For example, SPU 130-1 may send an acknowledge change owner message to the SPU that sent the change owner message.

If the change owner message is not received (block 640—NO), then a request may be routed to a state machine (block 650). For example, SPU 130-1 may route a query to a state machine associated with SPU 130-1 to address the status of the MAC entry and/or the non-owner SPUs that form the logical SPU ring.

FIG. 7 illustrates a flow chart of an exemplary process 700 for a non-owner SPU according to implementations described herein. Process 700 may be performed by a non-owner SPU of a particular MAC entry in a device having a set of ring-based distributed SPUs. Assume for discussion of process 700 that SPU 130-1 is a MAC owner that forms a logical ring with non-owner SPUs 130-2, 130-3, and 130-4.

A MAC learning packet may be received (block 710). For example, SPUs 130-2, 130-3, and 130-4 may receive a MAC learning packet from the MAC owner (e.g., SPU 130-1) indicating that a new MAC entry is being added to the global MAC table.

A MAC age counter may be started (block 720). For example, SPUs 130-2, 130-3, and 130-4 may initiate a MAC age counter for the particular MAC entry. It may be determine if MAC activity is indicated (block 730). For example, it may be determined if any subsequent packets having the same MAC entry are received at any of SPUs 130-2, 130-3, or 130-4. If MAC activity is indicated at any one of SPUs 130-2, 130-3, or 130-4 (block 730—YES), then the MAC age counter may be re-set (block 740). For example, if SPU 130-2 receives packets with the particular MAC entry, then SPU 130-2 may re-set in its MAC table the MAC age counter associated with the MAC entry. If no MAC activity is indicated (block 730—NO), then the MAC age counter may continue to count until a MAC age query is received (block 750). For example, SPU 130-2 may eventually receive a MAC age query packet from the MAC owner (e.g., SPU 130-1).

It may be determined if the MAC age counter is timed out (block 760). For example, due to SPU forwarding activity, the MAC age counter may be different than the MAC age counter at the MAC owner SPU. Thus, any of SPUs 130-2, 130-3, and 130-4, upon receiving the MAC age query packet may determine if the local MAC age counter associated with the MAC entry has timed out. If it is determined that the MAC age counter has timed out (block 760—YES), then the MAC age query packet may be forwarded to the next SPU in the logical ring (block 770). For example, SPU 130-2 may pass on the MAC age query packet to SPU 130-3. If it is determined that the MAC age counter has not timed out (block 760—NO), then a change ownership message may be sent to the MAC owner (block 780). For example, SPU 130-2 may send a change owner packet to SPU 130-1 to indicate that the particular MAC entry that was the subject of the MAC age query message has not timed out at SPU 130-2. SPU 130-2 may, thus, assume ownership of the MAC entry going forward.

Conclusion

Implementations described herein may include receiving a packet over the network, the packet including a media access control (MAC) address, and assigning one SPU as the MAC address owner. The method may also include sending information about the MAC address to other SPUs within the device, storing the MAC address in a MAC table within each SPU, and initiating a MAC age query to confirm the MAC address has timed out among all SPUs. The MAC age query may be passed via a logical ring of the SPUs beginning with the MAC address owner. If the MAC address ages out at each SPU, the MAC address may be deleted from each MAC table. If the MAC entry is still active, a different SPU may be assigned as the MAC address owner. The ring-based cooperative MAC learning/aging described herein allows for minimal impact on SPU performance by limiting IPC traffic and synchronizing MAC entries (e.g., flooding) only when necessary. The arrangement is easily scalable to accommodate insertion/removal of SPU cards.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5, 6, and 7, the order of the blocks may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement these aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A device, comprising a plurality of security process units (SPUs), each SPU comprising:
    a media access control (MAC) table to store a plurality of MAC entries; and
    a processor to:
        designate the SPU as a MAC owner when the SPU receives a new MAC entry;
        send a MAC learning packet, for the MAC entry, to each of the other SPUs;
        initiate, when the MAC entry ages out at the SPU, a MAC age query through a logical ring of the other SPUs;
        receive back the MAC age query if the MAC entry has aged out at each of the other SPUs;
        initiate deletion of the MAC entry from the MAC table based on the receiving back the MAC age query;
        receive a change owner message if the MAC entry has not aged out at another SPU of the logical ring of the other SPUs; and
        assign the other SPU as the new MAC owner if the MAC entry has not aged out.

2. The device of claim 1, where the processor further:
    sends an acknowledge change owner message to the other SPU based on the receiving the change owner message.

3. The device of claim 1, where the MAC table includes a MAC age counter, the MAC age counter being re-set when the SPU storing the MAC table registers activity for the MAC entry.

4. The device of claim 1, further comprising:
    multiple interfaces to receive incoming packets to the device, and
    a switch fabric to facilitate communication among the interfaces and/or the SPUs.

5. The device of claim 1, where the device comprises:
    a switch;
    a router;
    a server device; or
    a firewall device.

6. The device of claim 1, where only the MAC owner initiates a MAC age query for the MAC entry.

7. A method of managing media access control (MAC) entry aging in a device having distributed architecture of multiple security process units (SPUs), the method comprising:
    receiving a MAC entry at a first SPU, the first SPU being designated as a MAC owner;
    sending a MAC learning packet from the first SPU to each of the other SPUs;
    initiating, when the MAC entry ages out at the first SPU, a MAC age query from the first SPU serially through a logical ring of the other SPUs;
    receiving the MAC age query at the first SPU if the MAC entry has aged out at each of the other SPUs;
    initiating, by the first SPU, deletion of the MAC entry based on the receiving the MAC age query at the first SPU;
    receiving a change owner message at the first SPU if the MAC entry has not aged out at a second SPU, the second SPU being one of the logical ring of the other SPUs; and
    reassigning the second SPU as the new MAC owner if the MAC entry has not aged out.

8. The method of claim 7, where only the MAC owner initiates a MAC age query for the MAC entry.

9. The method of claim 7, further comprising:
sending an acknowledge change owner message from the first SPU to the second SPU based on the receiving the change owner message at the first SPU.

10. The method of claim 7, further comprising:
initiating, when the MAC entry ages out at the second SPU, a MAC age query from the second SPU serially through a logical ring of the other SPUs.

11. The method of claim 7, where the MAC age query is an inter-processor communication (IPC) message.

12. The method of claim 7, where each SPU of the multiple SPUs includes a state machine to resolve a lost MAC age query within the logical ring.

13. The method of claim 7, where each of the multiple SPUs stores the MAC entry in a MAC table.

14. The method of claim 13, where the MAC table includes a MAC age counter, the MAC age counter being re-set when the SPU storing the MAC table registers activity for the MAC entry.

15. The method of claim 7, where the MAC entry is received at the first SPU from an interface via a switch fabric.

16. A non-transitory computer-readable medium storing instructions, the instructions comprising:
one or more instructions which, when executed by a first security process unit (SPU), cause the first SPU to receive a media access control (MAC) entry, the first SPU being designated as a MAC owner that is designated to initiate a MAC age query for the MAC entry among a group of one or more other SPUs;
one or more instructions which, when executed by the first SPU, cause the first SPU to monitor an inactivity age of the MAC entry at the first SPU and the one or more other SPUs;
one or more instructions which, when executed by the first SPU, cause the first SPU to initiate, when the inactivity age reaches a particular threshold at the first SPU, the MAC age query from the first SPU through a logical ring of the one or more other SPUs;
one or more instructions which, when executed by the first SPU, cause the first SPU to receive the MAC age query if the inactivity age reaches the particular threshold at each of the one or more other SPUs;
one or more instructions which, when executed by the first SPU, cause the first SPU to initiate deletion of the MAC entry based on receiving the MAC age query;
one or more instructions which, when executed by the first SPU, cause the first SPU to receive a change owner message, to initiate a MAC owner change, from one of the one or more other SPUs, if the inactivity age has not reached the particular threshold at the one of the one or more other SPUs; and
one or more instructions which, when executed by the first SPU, cause the first SPU to assign the one of the one or more other SPUs as the new MAC owner if the MAC entry has not aged out at the one of the one or more other SPUs.

17. A method performed by a device in a network, the device including a plurality of security process units (SPUs), the method comprising:
receiving a packet over the network, the packet including a media access control (MAC) address;
assigning an SPU as an owner of the MAC address, where only the owner of the MAC address initiates a MAC age query for the MAC address;
sending information about the MAC address to other SPUs, of the plurality of SPUs, within the device;
storing the MAC address in a MAC table within each SPU;
initiating the MAC age query by the owner of the MAC address to confirm the MAC address has timed out among all SPUs, where the MAC age query is passed via a logical ring of the SPUs beginning and ending with the owner of the MAC address;
initiating deletion of the MAC address from each of the MAC tables if the MAC address has timed out among all SPUs;
receiving a change owner message if the MAC address has not aged out at one of the plurality of SPUs; and
assigning the one of the plurality of SPUs as the owner of the MAC address if the MAC address has not timed out at the one of the plurality of SPUs.

18. The method of claim 17, further comprising:
monitoring the inactivity time of the MAC address based on a MAC age timer at each SPU.

19. The method of claim 17, further comprising:
after assigning the different SPU as the owner of the MAC address, initiating a MAC age query by the different SPU to confirm the MAC address has timed out among all SPUs, where the MAC age query is passed via a logical ring of the SPUs beginning and ending with the different SPU.

* * * * *